(12) United States Patent
Kassai et al.

(10) Patent No.: US 7,493,835 B2
(45) Date of Patent: Feb. 24, 2009

(54) NEWBORN DUMMY

(75) Inventors: Kenzou Kassai, Osaki (JP); Sachiyo Suzuki, Tokyo (JP)

(73) Assignee: Graco Children's Products Inc., Exton, PA (US)

( * ) Notice: Subject to any disclaimer, the term of this patent is extended or adjusted under 35 U.S.C. 154(b) by 325 days.

(21) Appl. No.: 11/385,029

(22) Filed: Mar. 20, 2006

(65) Prior Publication Data

US 2006/0225525 A1    Oct. 12, 2006

(30) Foreign Application Priority Data

Mar. 18, 2005    (JP) .............................. 2005-079994

(51) Int. Cl.
    *G01M 19/00* (2006.01)
(52) U.S. Cl. ..................... 73/866.4; 73/714; 434/270; 434/274; 434/275
(58) Field of Classification Search ............... 73/866.4, 73/714; 434/270, 274, 275
    See application file for complete search history.

(56) References Cited

U.S. PATENT DOCUMENTS

| | | | | |
|---|---|---|---|---|
| 4,409,835 A | * | 10/1983 | Daniel et al. ................ | 73/866.4 |
| 4,691,556 A | * | 9/1987 | Mellander et al. .......... | 73/12.01 |
| 5,317,931 A | * | 6/1994 | Kalami ...................... | 73/866.4 |
| 5,526,707 A | * | 6/1996 | Smrcka ...................... | 73/866.4 |
| 5,528,943 A | * | 6/1996 | Smrcka et al. ............. | 73/866.4 |
| 6,749,433 B2 | * | 6/2004 | Kassai et al. ................ | 434/267 |
| 2004/0029090 A1 | * | 2/2004 | Kassai et al. ................ | 434/267 |

FOREIGN PATENT DOCUMENTS

| | | |
|---|---|---|
| EP | 1388833 | 2/2004 |
| EP | 06005491 | 6/2006 |
| FR | 2683320 | 5/1993 |
| JP | 2002328067 | 11/2002 |

* cited by examiner

*Primary Examiner*—Gunnar J Gissel
(74) *Attorney, Agent, or Firm*—Ditthavong Mori & Steiner, P.C.

(57) ABSTRACT

A newborn dummy used in a dynamic test comprises a head, a spine member including a neck member connected to the head, a trunk mounted on said spine member at a lower part of the neck member and provided so as to cover the spine member and spaced apart from the spine member. An abdomen pressure sensor is provided close to the spine member at a part corresponding to an abdomen in the trunk so as to be spaced apart from the trunk.

20 Claims, 2 Drawing Sheets

NEWBORN DUMMY

BACKGROUND OF THE INVENTION

1. Field of the Invention

The present invention relates to a newborn dummy and more particularly, to a newborn dummy which can detect a pressure applied to an abdomen of a newborn.

2. Description of the Background Art

A conventional newborn dummy is disclosed in Japanese Unexamined Patent Publication No. 2002-328067 (patent document 1), for example.

According to the above document, in order to grasp a moving distance of a head and values of impact shocks received at a chest and a hip and elucidate their occurring mechanism in case of a car accident, a newborn dummy having acceleration sensors at parts of a head, an upper part of a cervical vertebra, a chest and a hip is disclosed.

According to the newborn dummy disclosed in the patent document 1, since the acceleration sensors are provided at the head, the chest and the hip, an acceleration degree can be detected at each part but an occurring mechanism of an impact shock at an abdomen cannot be grasped. Although it is considered to provide a pressure sensor at the abdomen, since it is not possible to access the inside of the abdomen of the newborn dummy, there is a problem such that it is necessary to mount the pressure sensor directly at an external part of the abdomen, and an impact occurring mechanism in the abdomen of the newborn cannot be elucidated.

SUMMARY OF THE INVENTION

The present invention was made to solve the above problem and it is an object of the present invention to provide a newborn dummy which can detect a degree of impact shock in an abdomen of a newborn when the newborn is shocked at the abdomen in case of a car accident and the like.

A newborn dummy used in a dynamic test according to the present invention comprises a head, a spine member including a neck member connected to the head, a trunk mounted on the spine member at a lower part of the neck member and provided so as to cover the spine member, and an abdomen pressure sensor provided close to the spine member at a part corresponding to an abdomen of the trunk.

Since the abdomen pressure sensor is provided at the part corresponding to the abdomen of the trunk, when the abdomen receives a pressure such as an impact shock, its impact pressure in the trunk can be detected.

As a result, it is possible to provide the newborn dummy that can detect a degree of the impact shock in the abdomen in case that the abdomen of the newborn receives the impact shock.

Preferably, the abdomen pressure sensor is mounted on the spine member through a flexible material. More preferably, an angular acceleration sensor is provided at the neck member.

Further preferably, a weight ratio of the head comprising the angular acceleration sensor to the entire newborn dummy is almost 30%.

DESCRIPTION OF THE PREFERRED EMBODIMENTS

Figure 1:
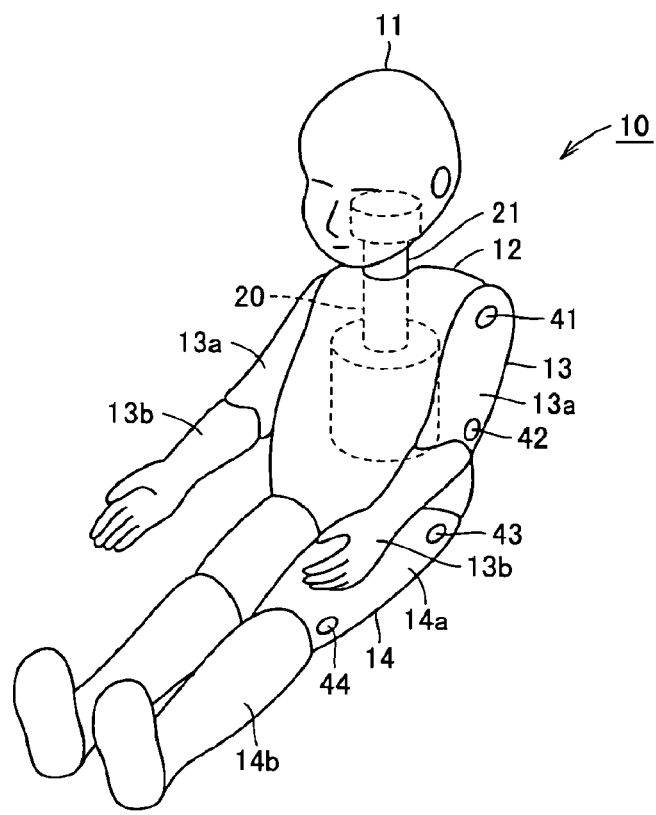
FIG. 1 is a perspective view showing a newborn dummy according to one embodiment of the present invention.

A structure of a newborn dummy 10 according to an embodiment of the present invention will be described with reference to the drawings hereinafter. FIG. 1 is an overall perspective view showing the structure of the newborn dummy 10 according to this embodiment. The newborn dummy 10 comprises a head 11, a trunk (including a hip) 12, arms 13, and legs 14. A pole spine member 20 corresponding to a spine of a newborn is provided under the head 11, and a neck member 21 is provided at an upper region of the spine member 20.

The head 11 is separated from the trunk 12 and connected to a shaft of the neck member 21 at the upper part of the spine member 20 so that it can be turned backward and forward and sideways using a well-known technique such as a universal joint. In addition, rotation torque to the spine member 20 in the head 11 is set so that it can be easily set by screwing a bolt and the like.

The arm 13 is connected by an axis 41 so that it can be moved similarly to a joint of a shoulder of the newborn. Furthermore, the arm 13 comprises an upper arm 13*a* and a forearm 13*b* and the upper arm 13*a* and the forearm 13*b* are connected by an axis 42 so that they can be moved similarly to a joint of an elbow of the newborn.

The leg 14 is connected to the trunk 12 by an axis 43 so that it can be moved similarly to a part of a crotch joint of the newborn. In addition, the leg 14 comprises a thigh 14*a* and a calf 14*b*, and the thigh 14*a* and the calf 14*b* are connected by an axis 44 so that they can be moved similar to a joint of a knee of the newborn.

Figure 2:
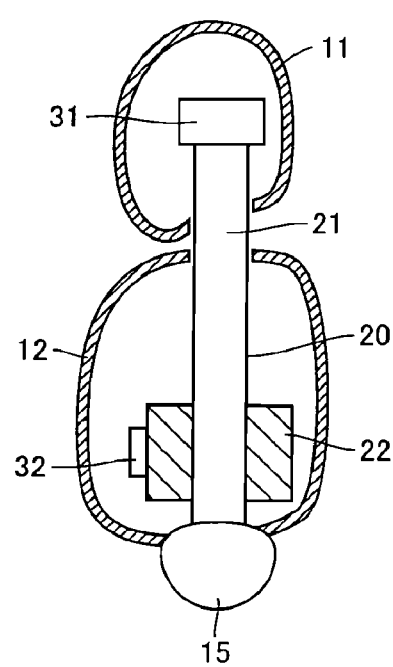
FIG. 2 is a sectional view showing a head and a trunk of the newborn dummy.

FIG. 2 is a sectional view showing the head 11 and the trunk 12 of the newborn dummy shown in FIG. 1. Referring to FIG. 2, the head 11 and the trunk 12 are connected by the spine member 20 that holds them separately. An angular acceleration sensor 31 for measurement in three axial directions is provided at an upper end of the neck member 21 in the head that corresponds to an upper end of a spine of the newborn. In addition, a hip 15 is provided under the spine member 20.

As shown in FIG. 2, space is provided between the spine member 20 and the trunk 12. In addition, a flexible member 22 formed of a soft material such as a sponge is mounted on the spine member 20 above the hip 15, and an abdomen pressure sensor 32 is provided on the flexible member 22. The flexible member 22 corresponds to an internal organ of the newborn. Space is also provided between the abdomen pressure sensor 32 and the trunk 12. The space between the spine member 20 and the trunk 12 and the space between the abdomen pressure sensor 32 and the trunk 12 may not be provided. Furthermore, the trunk 12 is formed of a soft material which is close to a human body.

Figure 3:
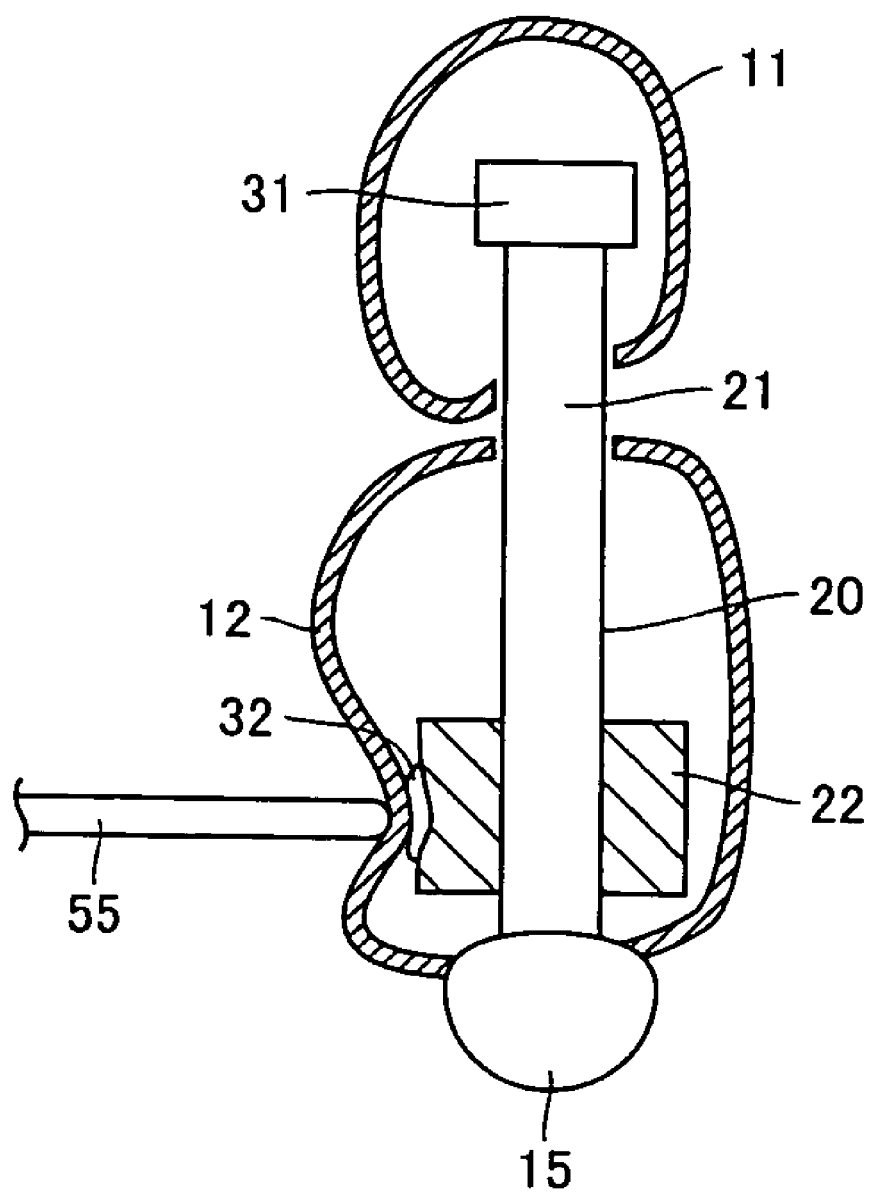
FIG. 3 is a view showing a state in which an abdomen of the newborn dummy receives an impact shock.

FIG. 3 shows a case where the above newborn dummy is shocked at an abdomen. FIG. 3 is a view showing an example of the case where the abdomen of the trunk 12 of the newborn dummy 10 receives an impact shock. As shown in FIG. 3, when the abdomen of the newborn dummy 10 is shocked by a pole 55 from the outside, its impact force is detected by the abdomen pressure sensor 32 provided on the flexible member 22 provided at the spine member 20 through the trunk 12 and the space.

Thus, when a dynamic test is performed using the newborn dummy 10, since the abdomen pressure sensor 32 is provided in the trunk 12, behavior in the abdomen in the dynamic test is equal to actual behavior of the actual newborn, so that a pressure applied to the inside of the abdomen of the newborn can be grasped.

Furthermore, since the abdomen pressure sensor 32 is mounted on the spine member 20 through the flexible member 22, the pressure applied to the inside of the abdomen of the newborn can be grasped more correctly.

Next, a description will be made of the angular acceleration sensor 31 for measurement in the three axial directions provided at the upper end of the spine member 20. According to the conventional newborn dummy, a plurality of acceleration sensors for measurement in three axial directions are provided. However, since the conventional sensor is the acceleration sensor, acceleration in the linear direction can be measured but acceleration in the rotation direction cannot be measured.

Meanwhile, in an actual traffic accident and the like, for example, the head 11 is moved not in the linear direction but in the three dimensional directions. Therefore, the acceleration in the rotation direction cannot be grasped in the conventional newborn dummy. Meanwhile, according to the present invention, since the angular acceleration sensor 31 is provided in the head 11, the behavior of the head in the rotation direction can be grasped.

Next, a description will be made of weight balances of the head 11, the trunk 12 and the like of the newborn dummy 10. According to the present invention, the weight balance of the newborn dummy 10 is designed so as to coincide with an actual weight balance of the newborn. For example, a total weight of the newborn dummy 10 including the abdomen pressure sensor 32 is set to about 3400 g. At this time, a weight of the head 10 including the angular acceleration sensor 31 is set to 1100 g which is about 30% of the total weight similar to the newborn.

Thus, since the weight balance between the head 11 and the total body including the abdomen pressure sensor 32 and the angular acceleration sensor 31 is conformed to the actual weight balance of the newborn, the behaviors of the head 11 and the abdomen at the time of the dynamic test are equal to actual behaviors of the head and the abdomen of the newborn, so that a moving direction and distance of the head and the abdomen and damage values received at the head and the abdomen can be grasped further more correctly.

In addition, according to this embodiment, since the angular acceleration sensor 31 is provided at a position corresponding to an upper end of a cervical vertebra of the newborn, a deviation of the cervical vertebra of the newborn can be measured more correctly, and a moving distance of the neck member 21 and a damage value received at the neck member 21 at the time of dynamic test can be comprehended correctly. As a result, an occurring mechanism of a damage in cervical vertebra when it is shocked can be elucidated.

In addition, although the angular acceleration sensor is only provided at the position corresponding to the upper end of the cervical vertebra of the newborn in the above embodiment, the present invention is not limited to this, and angular acceleration sensors may be provided at a lower end of the cervical vertebra, a center of gravity of a chest, a center of gravity of the hip and the like, respectively.

Although the newborn dummy according to the above embodiment has been developed mainly for the purpose of being set in a child-car seat and used in the dynamic test in case of a car accident mainly, it can be applied to a dynamic test in a baby carriage or another child-care instrument.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. A newborn dummy used in a dynamic test, comprising:
   a head;
   a spine member including a neck member connected to the head;
   a trunk mounted on said spine member at a lower part of said neck member and provided so as to cover said spine member; and
   an abdomen pressure sensor mounted to said spine member at a part corresponding to an abdomen of said trunk,
   wherein an angular acceleration sensor is provided at said neck member.

2. The newborn dummy according to claim 1, wherein said abdomen pressure sensor is mounted on said spine member through a flexible material.

3. The newborn dummy according to claim 1, wherein a weight ratio of said head comprising said angular acceleration sensor to the entire newborn dummy is almost 30%.

4. The newborn dummy according to claim 2, wherein said flexible material has a cylindrical shape.

5. The newborn dummy according to claim 2, wherein said flexible material is a sponge material.

6. The newborn dummy according to claim 5, wherein said flexible material has a cylindrical shape.

7. The newborn dummy according to claim 6, wherein an axis of said cylindrical shape of said flexible material is coaxial with an axis of said spine member.

8. The newborn dummy according to claim 7, wherein said abdomen pressure sensor is directly mounted to an outer circumferential surface of said cylindrical shape of said flexible material.

9. A newborn dummy used in a dynamic test, comprising:
   a head;
   a spine member including a neck member connected to the head;
   a trunk mounted on said spine member at a lower part of said neck member and provided so as to cover said spine member;
   an abdomen pressure sensor; and
   a flexible member directly mounted to said spine member at a part corresponding to an abdomen of said trunk, wherein said abdomen pressure sensor is directly mounted to said flexible member.

10. The newborn dummy according to claim 9, wherein said flexible member is made of a sponge material.

11. The newborn dummy according to claim 10, wherein said flexible member has a cylindrical shape.

12. The newborn dummy according to claim 11, wherein said abdomen pressure sensor is directly mounted to an outer circumferential surface of said cylindrical shape of said flexible member.

13. The newborn dummy according to claim 11, wherein an axis of said cylindrical shape of said flexible member is coaxial with an axis of said part of said spine member at which said flexible member is directly mounted.

14. The newborn dummy according to claim 13, wherein said abdomen pressure sensor is directly mounted to an outer circumferential surface of said cylindrical shape of said flexible member.

15. The newborn dummy according to claim 9, wherein said flexible member has a cylindrical shape.

16. The newborn dummy according to claim 15, wherein said abdomen pressure sensor is directly mounted to an outer circumferential surface of said cylindrical shape of said flexible member.

17. The newborn dummy according to claim 15, wherein an axis of said cylindrical shape of said flexible member is coaxial with an axis of said part of said spine member at which said flexible member is directly mounted.

18. The newborn dummy according to claim 17, wherein said abdomen pressure sensor is directly mounted to an outer circumferential surface of said cylindrical shape of said flexible member.

19. The newborn dummy according to claim 9, wherein an angular acceleration sensor is provided at said neck member.

20. The newborn dummy according to claim 19, wherein a weight ratio of said head comprising said angular acceleration sensor to the entire newborn dummy is almost 30%.

* * * * *

UNITED STATES PATENT AND TRADEMARK OFFICE
CERTIFICATE OF CORRECTION

| | |
|---|---|
| PATENT NO. | : 7,493,835 B2 |
| APPLICATION NO. | : 11/385029 |
| DATED | : February 24, 2009 |
| INVENTOR(S) | : Kenzou Kassai et al. |

It is certified that error appears in the above-identified patent and that said Letters Patent is hereby corrected as shown below:

Title page, item [75] Inventors, Line 2, the city of the first named inventor should read as follows:

Osaka (JP)

Signed and Sealed this

Eleventh Day of August, 2009

David J. Kappos
*Director of the United States Patent and Trademark Office*